(12) United States Patent
Andersen

(10) Patent No.: US 9,969,556 B2
(45) Date of Patent: May 15, 2018

(54) CONVEYOR BELT MODULE

(71) Applicant: AMMERAAL BELTECH MODULAR A/S, Vejle (DK)

(72) Inventor: Kenneth Westergaard Andersen, Kolding (DK)

(73) Assignee: Ammerall Beltech Modular A/S, Vejle (DK)

( * ) Notice: Subject to any disclaimer, the term of this patent is extended or adjusted under 35 U.S.C. 154(b) by 0 days. days.

(21) Appl. No.: 15/034,643

(22) PCT Filed: Nov. 6, 2014

(86) PCT No.: PCT/DK2014/050364
§ 371 (c)(1),
(2) Date: May 5, 2016

(87) PCT Pub. No.: WO2015/067274
PCT Pub. Date: May 14, 2015

(65) Prior Publication Data
US 2016/0272428 A1    Sep. 22, 2016

(30) Foreign Application Priority Data
Nov. 7, 2013 (DK) .................................. 2013 70650

(51) Int. Cl.
*B65G 17/08* (2006.01)
*B65G 17/40* (2006.01)
(52) U.S. Cl.
CPC ......... *B65G 17/083* (2013.01); *B65G 17/086* (2013.01); *B65G 17/40* (2013.01)
(58) Field of Classification Search
CPC ................................ B65G 17/08; B65G 17/40
(Continued)

(56) References Cited

U.S. PATENT DOCUMENTS 5,224,583 A * 7/1993 Palmaer ............... B65G 17/086
198/779
5,253,749 A * 10/1993 Ensch .................... B65G 17/08
198/834
(Continued)

FOREIGN PATENT DOCUMENTS

EP    0 521 506 A2    1/1993
EP      0907591 B1     6/2007
(Continued)

OTHER PUBLICATIONS

International Search Report and Written Opinion prepared by the European Patent Office on Feb. 2, 2015, for International Application No. PCT/DK2014/050364.
(Continued)

*Primary Examiner* — Douglas Hess
(74) *Attorney, Agent, or Firm* — Brent P. Johnson; Berg Hill Greenleaf Ruscitti LLP

(57) ABSTRACT

A conveyor belt module of the type having eye parts projecting outwardly from both sides of a central spine, where a plurality of interconnected belt modules define a transport plane, where the eye parts are offsetly spaced along the spine on either side of the spine, said spine defining a central line laterally on each module, such that eye parts on one belt module may be interfitted between eye parts on an adjacent module and mutually connected in a hinge-like manner, characterized in that the belt module comprises at least two types of eye parts: a first type of eye parts arranged on one side of the spine having a central opening in a direction orthogonal to the transport plane with parallel sides delimiting the eye part, and a second type of eye parts arranged on the other side of the spine having a central opening in a direction orthogonal to the transport plane with parallel sides delimiting the eye part, where adjacent the
(Continued)

distal end of the second type of eye parts, cams, projecting away from the sides of the eye part, are provided.

6 Claims, 2 Drawing Sheets

(58) Field of Classification Search
USPC .................................................. 198/850–853
See application file for complete search history.

(56) References Cited

U.S. PATENT DOCUMENTS

| | | | |
|---|---|---|---|
| 5,379,883 A * | 1/1995 | Damkjaer | B65G 17/08 198/853 |
| 5,566,817 A * | 10/1996 | Meeker | B65G 17/064 198/848 |
| 5,573,105 A * | 11/1996 | Palmaer | B65G 17/086 198/845 |
| 6,041,917 A | 3/2000 | Layne | |
| 6,050,397 A * | 4/2000 | Kato | B65G 17/08 198/851 |
| 6,223,889 B1 * | 5/2001 | Layne | B65G 17/086 198/853 |
| 6,330,941 B1 * | 12/2001 | Guldenfels | B65G 17/08 198/853 |
| 6,615,979 B2 * | 9/2003 | Etherington | B65G 17/068 198/851 |
| 7,070,043 B1 | 7/2006 | MacLachlan | |
| 7,228,959 B1 * | 6/2007 | Harrison | B65G 17/086 198/778 |
| 8,453,827 B2 | 6/2013 | Corley et al. | |
| 8,757,366 B2 * | 6/2014 | MacLachlan | B65G 17/08 198/844.1 |

FOREIGN PATENT DOCUMENTS

| | | |
|---|---|---|
| WO | WO 91/01261 A1 | 2/1991 |
| WO | WO 00/43299 A1 | 7/2000 |
| WO | WO 2010/053773 A1 | 5/2010 |

OTHER PUBLICATIONS

International Preliminary Report on Patentability for International (PCT) Patent Application No. PCT/DK2014/050364, dated May 10, 2016, 7 pages.

\* cited by examiner

CONVEYOR BELT MODULE

CROSS REFERENCE TO RELATED APPLICATIONS

This application is a national stage application under 35 U.S.C. 371 and claims the benefit of PCT Application No. PCT/DK2014/050364 having an international filing date of Nov. 6, 2014, which designated the United States, which PCT application claimed the benefit of Danish Patent Application No. PA 2013 70650 filed Nov. 7, 2013, the disclosure of each of which are incorporated herein by reference.

FIELD OF THE INVENTION

The present invention relates to a conveyor belt module of the type having eye parts projecting outwards from both sides of a central spine as well as a conveyor made up of such belt modules.

BACKGROUND OF THE INVENTION

For a number of applications where modular conveyor belts are used different requirements to the conveyor belt need to be addressed depending on the production line and type of goods which are to be transported by the conveyor.

In some applications to which the present invention is directed it is desirable to provide a conveyor which allows a medium such as for example water or air to pass easily through the conveyor belt with as little obstruction as possible and at the same time retain the integrity, flexibility and strength of the conveyor.

A prior art conveyor belt of this type is disclosed in U.S. Pat. No. 8,453,827. This conveyor belt structure is particularly designed for use in spiral conveyors where the side flexing capabilities of the construction are very important, i.e. such that the inner part of the conveyor belt relative to the turning radius may collapse relative to the outer part of the belt module.

Therefore, when there are openings between intermeshed eye parts it is necessary to provide guidance or stabilizing features such that the conveyor belt will maintain a steady transport through the conveying part.

For these purposes each conveyor belt module in the prior art above is provided with enlarged distal ends of the eye parts such that the distal ends of the eye parts when intermeshed will guide and control the movement of an adjacent modular belt module.

The distal ends are in some embodiments provided with oblique sections in order to improve the guidance and containment of adjacent modular belt modules. Some of the eye parts are furthermore provided with openings orthogonal to the transport plane in order to allow air or water to pass through the belt as desired depending on the application.

One drawback with the belt modules according to U.S. Pat. No. 8,453,827 is the fact that the eye parts are relatively compact and due to the massive construction of the distal ends of the eye parts the air flow or water flow through a conveyor belt made of such modules is fairly restricted.

A further example is disclosed in U.S. Pat. No. 7,073,662 where the eye parts have an opening orthogonal to the transport plane and a fairly homogenous material thickness throughout the entire eye parts. In the collapsed state, however, a conveyor made from such modules will have a very limited ability to drain water or allow air flow, and due to the relatively thin material thickness of the eye parts it is necessary to provide relatively heavy and strong side sections in order to be able to transfer the forces to which such a conveyor belt is exposed.

Further examples are disclosed in WO 2013 086220, US 2003 024794, EP0907591, WO9101261 and others.

Common for all these prior art devices is that although they allow for flow of for example water or air orthogonal to the transport plane of the conveyor the open flow area is relatively limited which is made even worse when the belt constructions collapse at the inner radius due to the conveyor belt's travel through a curve.

OBJECT OF THE INVENTION

Consequently, it is the object of the present invention to provide a conveyor belt module and a conveyor which addresses these problems and provides a conveyor belt which is more open and still retains its stability, guidance, etc.

DESCRIPTION OF THE INVENTION

The present invention addresses this by providing a conveyor belt module of the type having eye parts projecting outwardly from both sides of a central portion, where a plurality of interconnected belt modules define a transport plane, where the eye parts are offsetly spaced along opposing sides of the central portion, such that eye parts on one belt module may be interfitted between eye parts on an adjacent module and mutually connected in a hinge-like manner by hinge connection means, characterized in that a first type of eye parts arranged on one side of the central portion, has a central opening in a direction orthogonal to the transport plane with parallel sides delimiting the sides of the eye part, and a connecting bridge connecting the sides of the eye part furthest away from the central portion a second type of eye parts arranged on the other side of the central portion, said second type of eye-parts having a central opening in a direction orthogonal to the transport plane with parallel sides delimiting the eye part, and a connecting bridge connecting the sides of the eye part furthest away from the central portion where adjacent the distal end of the second type of eye parts, cams projecting away from the sides of the eye part are provided, where said cams are provided in a lower part of the eye parts, below the hinge connection means, and where the extent of the cams in the module's intended travelling direction corresponds to the extent of the hinge connection means in the same direction.

In connection with the present invention the central portion shall be understood as that part of the module between the eye parts arranged on either side of the module. The central portion may have an extent in the travelling direction, i.e. in the shape of a plate or other surface suitable to carry products, objects, goods and the like. The central portion may alternatively be in the form of a spine, i.e. have a very narrow/slim shape, substantially only able to support products, objects, goods and the like in very well defined and limited support points. Within this application the features "central portion" and "central spine" will both be used to describe more or less the same feature in the various embodiments.

As only eye parts on one side of the spine, i.e. one side of the modular belt module, have cams, the open area is increased relative to the prior art devices and as such increased flow is allowed. This is further emphasized in that the extent of the cams in the intended travelling direction of the conveyor belt modules is limited to coincide with the hinge means. By this construction the cams do not additionally obstruct flow orthogonal to the conveying plane, as the hinge means necessarily needs to obstruct this flow in order to create the hinge like connection between adjacent conveyor belt modules. At the same time the strength of the conveyor belt is maintained due to the material in the eye parts.

The cams are then "hidden" in a flow-sense below the hinge-like connection, and therefore provide the facility of maintaining adjacent belt modules in a correct lateral position, without (further) obstructing the flow through the module.

By this configuration a larger flow area is allowed in that the cam part is removed from the surface of the conveyor belt module, potentially being in contact with products carried on the conveyor. It will therefore be possible for the medium be it air or water to flow through the entire opening/aperture provided in the conveyor belt orthogonal to the transport plane, and find an optimal flow path through the module without being hampered by cams. The same is true for the connection pin which will typically be removed a few millimeters from the top surface/transport plane of the conveyor belt.

In a further advantageous embodiment of the invention the first type of eye parts is laterally offset at a distance corresponding to the width of the second type of eye part plus the lateral distance of two cams and optionally play tolerance.

With these relative measurements allowance is made for two adjacent modular belt modules being intermeshed such that eye parts of a first type on a first module may be interfitted in the opening between the second type of eye parts on a second adjacent belt module and in this manner the eye parts may be brought to overlap such that a hinge-like connection can be established between adjacent belt links. At the same time the distance allows for a small relative movement of the adjacent belt modules depending partly on the lateral extent of the cams and partly on the play tolerances allowed between the eye parts.

In a further advantageous embodiment all eye parts are provided with apertures allowing a connection pin to be laterally inserted through overlapping eye part apertures of adjacent belt modules. In the art there are also other manners in which to create hinge-like connections, but by providing apertures in the eye-parts allowing a connection pin to be laterally inserted a very simple and reliable connection is made.

In a still further advantageous embodiment of the invention a third type of eye-parts are provided, where said third type of eye parts is arranged in at least one side of the belt module, where the third type of eye part does not have a central opening in a direction orthogonal to the transport plane.

This third type of eye part is typically provided in order to provide strength to the conveying structure as is the case in the art.

In a still further advantageous embodiment of the invention the spine at least in the outer sections where the third type of eye parts is arranged is corrugated in the intended travelling direction, such that the third eye parts are arranged integrated in portions of the corrugated spine furthest away from the central line of the spine.

The corrugated spine is provided in order to allow increased collapse of the conveyor belt in that the corrugations are typically formed such that when an eye part from an adjacent belt module is forced into the opening between two eye-parts on the adjacent module it would normally, naturally depending on the size of the aperture provided in the eye parts, engage the spine, but by bending the spine thereby creating the corrugated structure an increased collapse is provided.

The invention is also directed to a conveyor belt assembled from a plurality of belt modules as already described above. Naturally such a conveyor belt will enjoy the same advantages over the prior art as has been mentioned previously.

DESCRIPTION OF THE DRAWING

The invention will now be described with reference to the accompanying drawings in which.

DETAILED DESCRIPTION OF THE INVENTION

Figure 1:
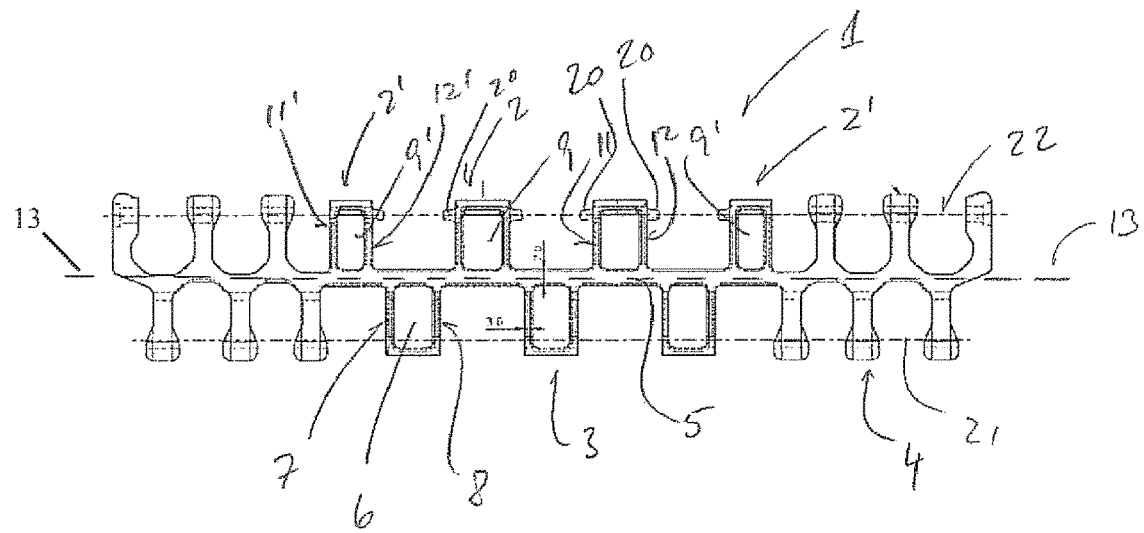
FIG. 1 illustrates a conveyor belt module according to the present invention

In FIG. 1 is illustrated conveyor belt module 1 according to the present invention. The conveyor belt module 1 has eye parts 2, 3, 4 projecting outwardly from both sides of a central spine 5. The eye parts 2, 3, 4 are offsetly spaced such that it is possible to position the eye parts 2 on one side of the spine between eye parts 3 on an adjacent module and in this manner connect adjacent modules, but for example by inserting connection pin (not illustrated) through apertures 10, 10', see FIG. 2. In this manner connected conveyor belt modules according to the invention will create a transport plane having a substantially flat top surface.

The inventive conveyor belt module comprises at least two types of eye parts, a first type 2, 3 of eye parts arranged on one side of the spine has a central opening 6 in a direction orthogonal to the transport plane having parallel sides 7, 8 delimiting the eye part 3.

The second type of eye parts 2, 2' are arranged on the other side of the spine 5 and are also provided with a central opening 9, 9' in a direction orthogonal to the transport plane. The eye parts have parallel sides 11, 12, 11', 12' delimiting the eye part where adjacent the distal end of the second type of eye parts 2, 2' cams 20 projecting away from the sides 11, 12, 11', 12' of the eye part 2, 2'.

The spine 5 defines (an imaginary) central line 13 laterally on each module.

The first eye parts 3 have a width in the lateral direction corresponding to the distance between two adjacent cams 11, 12 on adjacent second eye parts 2, 3 plus play tolerances (if any) such that they may be interleafed and accommodate each other when conveyor belt modules of this type are assembled into a conveyor belt.

The play tolerances may naturally be designed such that free movement and particularly free movement when the belt is collapsed as will be explained below, but on the other hand the play should be minimized in order to provide as much guidance as possible between adjacent belt links in order to provide a steady and smooth travel of the conveyor belt.

The connection between adjacent modular belt links is in the illustrated embodiment accomplished by inserting connection pins schematically illustrated by the dashed lines 21, 22 through overlapping eye parts of adjacently connected modules.

Figure 2:
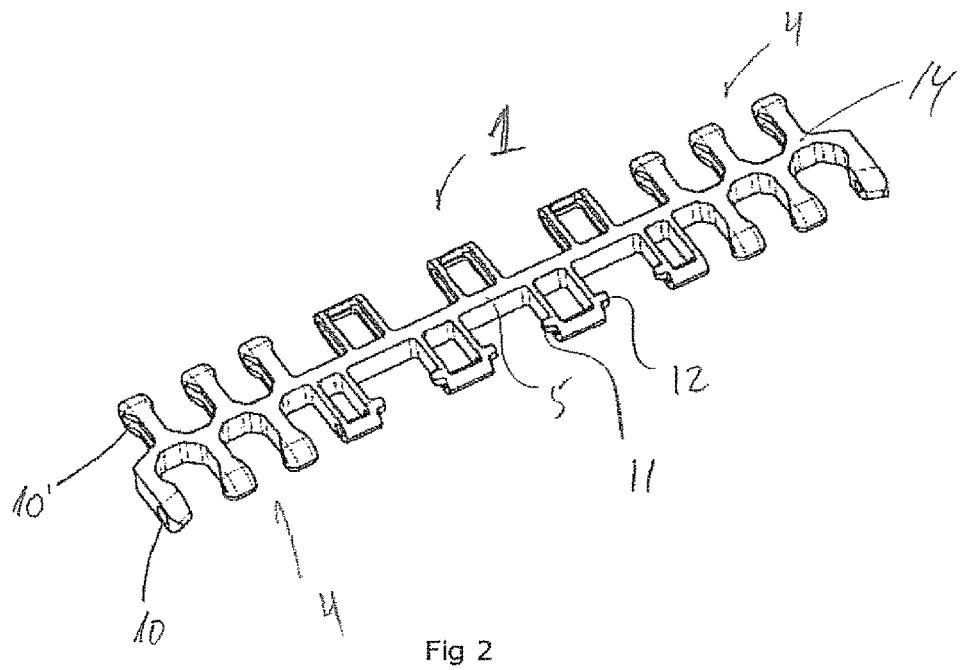
FIG. 2 illustrates the bottom side of a modular conveyor belt module

Turning to FIG. 2 the apertures 10, 10' are easily recognized and in this embodiment the apertures 10 on one side of the spine 5 are configured as substantially circular holes 10 whereas on the opposite side of the spine 5 the apertures 10' are elongated in the travelling direction of the conveyor belt, such that two modular conveyor belt modules may be displaced relatively to each other by the connection pin (not illustrated) sliding in the elongated aperture 10'. In this manner it becomes possible to collapse the belt in one side and keep it extended in the other side or vice-versa, such that the belt can travel through a radius in the conveying path. Also a third type of eye parts 4 are provided particularly along the side edges of the module in order to be able to take up the higher loads and stresses which will occur in these sections as a modular conveyor travels through turns.

FIG. 2 illustrates the bottom side of a modular conveyor belt module 1 wherein the cams 11, 12 may be seen as only extending a slight distance up from the bottom side 14 of the conveyor belt module. In this manner the air or water or other media which it is desirable to let drain off the conveyor belt is provided with a substantially unimpeded opening orthogonal to the plane of the conveyor's transport surface. The cams will of course obstruct the flow to a certain degree, but it is greatly minimized as the cams only project a short distance up from the bottom 14 of the modular belt link such that the medium (water or air) may find a flow path around the cams not being obstructed by the cams going all the way to the top surface or as in the prior art by the relatively massive constructions of the eye parts in this position.

Figure 3:
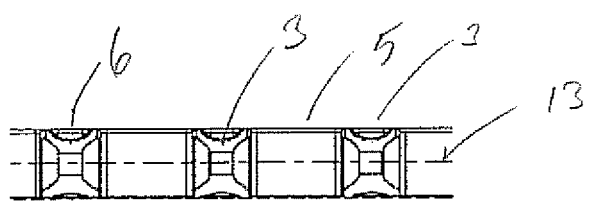
FIG. 3 illustrates a vertical view of the first type of eye parts

In FIG. 3 is illustrated a vertical view of the first type of eye parts 3 where it is clearly seen that no cams extend from the eye parts in a lateral direction.

Figure 4:
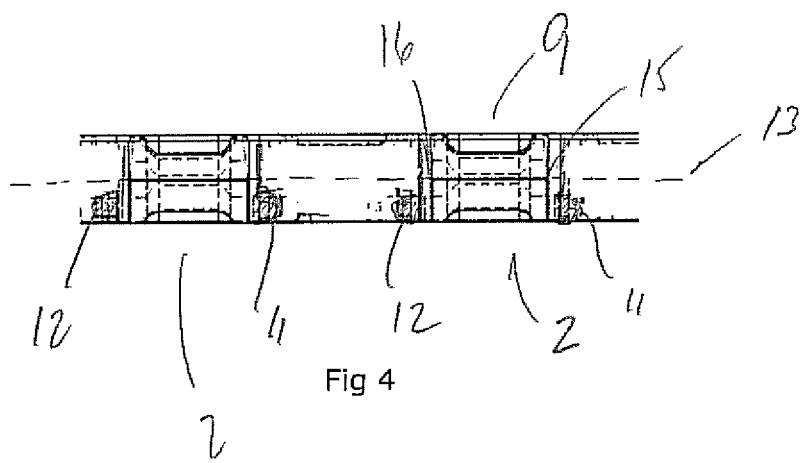
FIG. 4 illustrates a vertical plane view of a section of a module.

In FIG. 4 is illustrated a vertical plane view of a section of a module as illustrated in FIG. 1. The second type of eye parts is provided with cams 11, 12 extending from the parallel sides 15, 16 of the eye part. The parallel sides 15, 16 as well as the front of the eye parts delimit the opening 9 which is open for flow of media as discussed above. The lateral distance between adjacent cams 11, 12 on two adjacent eye parts allows the first type of eye part 3 to be interposed optionally with a degree of play tolerance in order to allow the modules to move freely.

The invention has now been explained with reference to a specific embodiment but variations are contemplated within the scope of the appended claims.

The invention claimed is:

1. A conveyor belt module of the type having eye parts projecting outwardly from both sides of a central portion, where a plurality of interconnected belt modules define a transport plane, where the eye parts are offsetly spaced along opposing sides of the central portion, such that eye parts on one belt module may be interfitted between eye parts on an adjacent module and mutually connected in a hinge-like manner by hinge connection means, wherein a first type of eye parts arranged on one side of the central portion has a central opening in a direction orthogonal to the transport plane with parallel sides delimiting the sides of the eye part, and a connecting bridge connecting the sides of the eye part furthest away from the central portion a second type of eye parts arranged on the other side of the central portion, said second type of eye-parts having a central opening in a direction orthogonal to the transport plane with parallel sides delimiting the eye part, and a connecting bridge connecting the sides of the eye part furthest away from the central portion where adjacent the distal end of the second type of eye parts, cams, projecting away from the sides of the eye part are provided, where said cams are provided in a lower part of the eye parts, below the hinge connection means, and where the extent of the cams in the module's intended travelling direction corresponds to the extent of the hinge connection means in the same direction.

2. The conveyor belt module according to claim 1 wherein the first type of eye parts is laterally offset along a side of the central portion, a distance corresponding to the width of the second type of eye part plus the lateral distance of two cams and optionally play tolerances.

3. The conveyor belt according to claim 1 wherein all eye parts are provided with apertures allowing a connection pin to be laterally inserted through overlapping eye part apertures of adjacent belt modules.

4. The conveyor belt module according to claim 1 wherein a third type of eye parts is provided, where said third type of eye parts is arranged in at least one side of the central portion, where the third type of eye part does not have a central opening in a direction orthogonal to the transport plane.

5. The conveyor belt module according to claim 4 wherein the central portion at least in the outer sections where the third type of eye parts is/are arranged is corrugated in the intended travelling direction, such that the third eye parts are arranged integrated in portions of the corrugated central portion furthest away from a central lateral line of the central portion.

6. A conveyor belt assembled from a plurality of belt modules of the type having eye parts projecting outwardly from both sides of a central portion, where a plurality of interconnected belt modules define a transport plane, where the eye parts are offsetly spaced along the central portion on either side of the central portion, said central portion defining a central line laterally on each module, such that eye parts on one belt module may be interfitted between eye parts on an adjacent module and mutually connected in a hinge-like manner, where the belt module comprises at least two types of eye parts:

a first type of eye parts arranged on one side of the central portion, has a central opening in a direction orthogonal to the transport plane with parallel sides delimiting the sides of the eye part, and a connecting bridge connecting the sides of the eye part furthest away from the central portion a second type of eye parts arranged on the other side of the central portion, said second type of eye-parts having a central opening in a direction orthogonal to the transport plane with parallel sides delimiting the eye part, and a connecting bridge connecting the sides of the eye part furthest away from the central portion where adjacent the distal end of the second type of eye parts, cams projecting away from the sides of the eye part are provided, where said cams are provided in a lower part of the eye parts, below the hinge connection means, and where the extent of the cams in the module's intended travelling direction corresponds to the extent of the hinge connection means in the same direction.

* * * * *